United States Patent [19]

Van Hijfte et al.

[11] Patent Number: 4,525,198

[45] Date of Patent: Jun. 25, 1985

[54] PROCESS FOR THE PRODUCTION OF UREA GRANULES

[75] Inventors: Willy H. P. Van Hijfte, Assenede; Luc A. Vanmarcke, Kaprijke-Lembeke, both of Belgium

[73] Assignee: Compagnie Neerlandaise de l'Azote, Brussels, Belgium

[21] Appl. No.: 474,477

[22] Filed: Mar. 11, 1983

Related U.S. Application Data

[63] Continuation of Ser. No. 263,310, May 13, 1981, abandoned.

[51] Int. Cl.$^3$ ................................................ C05C 9/00
[52] U.S. Cl. ........................................ 71/28; 71/64.13
[58] Field of Search .................... 71/28, 64.06, 64.1, 71/64.13

[56] References Cited

U.S. PATENT DOCUMENTS 4,219,589 8/1980 Niks et al. ............................ 71/28 X

FOREIGN PATENT DOCUMENTS 145015 11/1980 Fed. Rep. of Germany .......... 71/28

*Primary Examiner*—Ferris H. Lander
*Attorney, Agent, or Firm*—Scully, Scott, Murphy & Presser

[57] ABSTRACT

The production of urea granules by prilling or granulating a urea melt or an aqueous urea solution, which melt or solution contains a magnesium oxide containing additive. The urea granules thus obtained exhibit a high crushing strength, a high apparent density, and a very low caking tendency, and are suitable for bulk blending with single and triple superphosphate granules.

4 Claims, No Drawings

PROCESS FOR THE PRODUCTION OF UREA GRANULES

This is a continuation of application Ser. No. 263,310, filed May 13, 1981, now abandoned.

For the production of urea granules, various methods are known. One of these is prilling, by which in this specification is understood a method in which a substantially anhydrous urea melt (having a water content of no more than 0.1 to 0.3% by weight) is sprayed in the top of a prilling column in a rising stream of air of ambient temperature, in which the droplets solidify. The resulting prills have a maximum diameter of not much more than 3 mm, and are mechanically rather weak.

Urea granules having larger dimensions and better mechanical properties can be produced by the granulation of a substantially anhydrous urea melt in a drum granulator, for example, by the spherodizer technique as described in British Pat. No. 894,773, or in a pan granulator, for example as described in U.S. Pat. No. 4,008,064, or by the granulation of an aqueous urea solution in a fluidized bed, for example as described in Dutch patent application 7806213. In the process described in the last-mentioned publication, an aqueous urea solution having a urea concentration of 70–99.9% by weight, preferably 85–96% by weight, is sprayed in the form of very fine droplets having an average diameter of 20–120 micron into a fluidized bed of urea particles at a temperature at which the water evaporates from the solution sprayed onto the particles, and urea solidifies on the particles to form granules having a desired size which may be 25 mm and more. As, in this process, rather large amounts of flydust are formed, especially if the urea solution used as the starting material contains more than 5% by weight of water, in particular more than 10% by weight of water, preferably a crystallization retarder for the urea, in particular a water-soluble addition or condensation product of formaldehyde and urea, is added to the urea solution, whereby the formation of flydust is suppressed practically completely. The result of the presence of the crystallization retarder is that the granules remain plastic as they are being formed, so that owing to rolling and/or impacts during the formation mechanically strong, smooth and round granules may be formed.

The resulting granules have a high crushing strength, a high impact resistance, and little tendency of forming flydust through abrasion, and moreover do not cake together, not even upon prolonged storage, although urea exhibits a strong natural tendency of caking together.

Urea granules produced according to one of the known methods cannot be used for the production of heterogeneous binary and ternary fertilizer mixtures, such as N-P or N-P-K mixtures by bulk blending with the cheap superphosphate or triple superphosphate, as such urea granules are incompatible with these phosphates. Mixtures of such urea granules with superphosphate or triple superphosphate granules deliquesce after some time to form an unmanageable and unusable mud. According to a paper by G. Hoffmeister and G. H. Megar, presented during "The Fertilizer Industry Round Table" on Nov. 6, 1975, at Washington D.C., this incompatibility is caused by a reaction according to the following equation $$Ca(H_2PO_4)_2 \cdot H_2O + 4CO(NH_2)_2 \rightarrow 3$$
$$Ca(H_2PO_4)_2 \cdot 4CO(NH_2)_2 + H_2O$$

By the reaction of 1 mol monocalcium phosphate monohydrate, the main component of superphosphate and triple superphosphate, with 4 mols urea, a urea-monocalcium phosphate adduct is formed, with 1 mol water being released. As the adduct has a high solubility, it is readily dissolved in the water liberated to form a large volume of solution, which wets the granules in the mixture, owing to which the reaction proceeds at an ever faster rate. Up until now, no commercially acceptable means have been found to make urea compatible with superphosphate or triple superphosphate. As a consequence, it is virtually only the more expensive phosphate fertilizers monoammonium phosphate and diammonium phosphate that can be used for bulk blending with urea.

It is an object of the present invention to provide a process for the production of urea granules having extraordinary properties, including compatibility with superphosphate and triple superphosphate granules.

According to the invention, there is provided a process for the production of urea granules by prilling or granulating a urea melt or an aqueous urea solution, which process is characterized in that the urea melt or solution to be prilled or granulated contains a magnesium oxide containing additive.

It has surprisingly been found that the granules produced according to the invention are compatible with superphosphate and triple superphosphate granules, by virtue of which they are suitable for bulk blending with these phosphate fertilizers. Mixtures of urea granules obtained according to the invention with superphosphate granules or triple superphosphate granules that were subjected to the "TVA Bottle Test" at 27° C. were still dry after 7 weeks, whereas analogous mixtures with urea granules not produced in accordance with the invention had deliquesced completely after 3 days.

It has further been found that the presence of magnesium oxide during the prilling or granulation of a urea melt or solution has for its result that the building-up of the granules proceeds flawlessly, and the formation of flydust is prevented, while in addition the resulting urea granules have a very high crushing strength and a very high apparent specific gravity. A further highly surprising feature is that the urea granules produced according to the invention do not cake together, not even upon prolonged storage.

The magnesium oxide can be used as such (MgO) or in the form of fully calcined dolomite (MgO+CaO) or of selectively calcined dolomite (MgO+CaCO₃). A beneficial effect is already observed with a quantity of additive corresponding to 0.1% by weight of MgO, calculated on the urea in the melt or solution. Preferably the additive is used in a quantity corresponding to 0.5–2% by weight of MgO, calculated on the urea in the melt or solution. If desired, higher proportions may be used, but this does not offer any particular advantages. The additive may be added in the form of a powder to the urea melt or solution prior to prilling or granulating.

Preferably, after their formation the granules are cooled to 30° C. or to a lower temperature, for example by means of a stream of air, the moisture content of which has preferably been reduced to such an extent that during the cooling process the granules do not absorb moisture from the cool air.

The invention also relates to compatible, heterogeneous fertilizer mixtures of urea granules obtained by the process according to the present invention with superphosphate or triple superphosphate granules, and, if desired, one or more other granular substances.

In addition to urea and superphosphate or triple superphosphate, a potassium fertilizer is mostly included in the mixture, such as KCl. To prevent segregation of the mixture, the granule dimensions of the components to be blended must be adapted to one another.

For further information regarding the production of fertilizer granules, reference is made with regard to prilling to U.S. Pat. No. 3,130,225, with regard to granulation in a pan granulator to U.S. Pat. No. 4,008,064, with regard to granulation in a drum granulator to British Pat. No. 894,773 and with regard to granulation in a fluidized bed to Dutch patent application 7806213.

The effect of the process according to the invention is shown in and by the following examples. The "TVA Bottle Test" referred to in the examples serves to determine the compatibility of urea granules with superphosphate and triple superphosphate granules. In this test, a mixture of the urea granules to be tested with superphosphate or triple superphosphate granules was kept in a closed bottle of 120 cm$^3$ at 27° C. and the condition was periodically inspected. The condition observed is evaluated as follows:

Condition of the mixture
D=dry, free-flowing
W-1=moisture patches, but usable
W-2=moist and slightly sticky, but probably usable
W-3=wet through and sticky, unsuitable for use
W-4=very wet, unsuitable for use
H=hard caked together, unsuitable for use.

In the "bag test" referred to in the examples, the caking tendency of the granules tested was determined. In this test urea granules were packed in bags of 35 kg, which were stored under a weight of 1000 kg at 27° C. After 1 month, the average number of lumps per bag was determined, and the average hardness of the lumps was measured. By hardness is understood here the force in kg, exercised by a dynamometer to cause a lump of 7×7×5 cm to disintegrate.

The crystallization retarder F 80, referred to in the examples, is a clear viscous liquid commercially available under the name of "Formurea 80", which is stable between −20° C. and +40° C., and upon analysis is found to contain per 100 parts by weight approximately 20 parts by weight of water, approximately 23 parts by weight of urea and approximately 57 parts by weight of formaldehyde, approximately 55% of the formaldehyde being bound as trimethyl urea, and the balance being present in the unbound state.

EXAMPLE I

Tests were conducted in which an aqueous urea solution with and without a known crystallization retarder (F 80) and with magnesium oxide as a crystallization retarder was sprayed into a fluidized bed of urea particles. The granulation conditions and the physical properties of the resulting granules are listed in Tabel A.

TABLE A

| Crystallization retarder | none | 1% F80 | 0.6 MgO | 1% MgO |
|---|---|---|---|---|
| Granulation conditions | | | | |
| urea solution | | | | |
| concentration, % by weight | 96.4 | 94.5 | 94.5 | 94.5 |
| temperature, °C. | 130 | 130 | 130* | 130 |
| rate of flow, kg/h | 280 | 280 | 280 | 280 |
| injection air | | | | |
| rate of flow, Nm$^3$/h | 130 | 130 | 130 | 130 |
| temperature, °C. | 140 | 140 | 140 | 140 |
| fluidization air | | | | |
| rate of flow, Nm$^3$/h | 850 | 850 | 850 | 850 |
| temperature, °C. | 45 | 64 | 54 | 58 |
| bed temperature, °C. | 108 | 105 | 104 | 104 |
| Product properties | | | | |
| apparent density, g/cm$^3$ | 1.23 | 1.26 | 1.30 | 1.31 |
| crushing strength dia. 2.5 mm, kg | 2.1 | 2.8 | 4.0 | 4.3 |
| fly dust, g/kg | 5.4 | <0.1 | 0.1 | <0.1 |
| bag test | | | | |
| lumps, % | 100 | 10 | 0 | 0 |
| hardness, kg | 22 | 0.1 | 0 | 0 |
| TVA Bottle Test with superphosphate (SSP) 50/50 | | | | |
| after 1 day | W-2 | W-2 | D | D |
| after 3 days | W-4 | W-4 | D | D |
| after 7 days | W-4 | W-4 | D | D |
| after 14 days | W-4 | W-4 | W-1 | D |
| after 21 days | W-4 | W-4 | W-1 | D |
| after 50 days | W-4 | W-4 | W-1 | D |
| with triple superphosphate (TSP) 50/50 | | | | |
| after 1 day | W-2 | W-2 | D | D |
| after 3 days | W-4 | W-4 | D | D |
| after 7 days | W-4 | W-4 | D | D |
| after 14 days | W-4 | W-4 | W-1 | D |
| after 21 days | W-4 | W-4 | W-1 | D |
| after 50 days | W-4 | W-4 | W-1 | D |

EXAMPLE II

A subsequent series of tests were conducted analogously to those described in Example I, but using selectively calcined dolomite and completely calcined dolomite as crystallization retarders instead of magnesium oxide. The granulation conditions and the physical properties of the resulting granules are listed in Table B.

TABLE B

| Crystallization retarder | none | selectively calcined dolomite | | completely calcined dolomite | |
|---|---|---|---|---|---|
| | | 1.5% | 3% | 1.5% | 3% |
| Granulation conditions | | | | | |
| urea solution | | | | | |
| concentration, % by weight | 94.5 | 95.5 | 95.5 | 95.5 | 95.5 |
| temperature, °C. | 130 | 130 | 130 | 130 | 130 |
| rate of flow, kg/h | 200 | 220 | 220 | 220 | 220 |
| injection air | | | | | |
| rate of flow, Nm$^3$/h | 130 | 130 | 130 | 130 | 130 |
| temperature, °C. | 140 | 134 | 149 | 150 | 149 |
| fluidization air | | | | | |
| rate of flow, Nm$^3$/h | 850 | 850 | 850 | 850 | 850 |
| temperature, °C. | 58 | 75 | 66 | 53 | 57 |

TABLE B-continued

| Crystallization retarder | none | selectively calcined dolomite | | completely calcined dolomite | |
| --- | --- | --- | --- | --- | --- |
| | | 1.5% | 3% | 1.5% | 3% |
| bed temperature, °C. | 100 | 98 | 92 | 95 | 94 |
| Product properties | | | | | |
| apparent density, g/cm³ | 1.22 | 1.29 | 1.31 | 1.29 | 1.32 |
| crushing strength, dia. 2.5 mm/kg | 1.9 | 4.0 | 3.9 | 3.7 | 3.4 |
| fly-dust, g/kg | 2.2 | 0 | 0 | 0 | 0 |
| bag test | | | | | |
| lumps, % | 100 | 9 | 7 | 10 | 23 |
| hardness, kg | 13 | <1 | <1 | 2 | 2 |
| TVA Bottle Test | | | | | |
| with SSP 50/50 | after 3 days deliquesced | 14 days usable | 14 days usable | more than 60 days usuable | more than 60 days usable |
| with TSP 50/50 | after 3 days deliquesced | 14 days usable | 14 days usable | more than 60 days usable | more than 60 days usable |

EXAMPLE III

A substantially anhydrous urea melt with and without added magnesium oxide was sprayed in the top of a prilling column in a rising stream of air of ambient temperature. The physical properties of the resulting prills are listed in Table C.

TABLE C

| Additive | none | 0.72% MgO | 0.95% MgO |
| --- | --- | --- | --- |
| Product properties | | | |
| apparent density, g/cm³ | 1.30 | 1.32 | 1.33 |
| crushing strength, dia. 2.5 mm, kg | 0.54 | 1.04 | 1.16 |
| bag test | | | |
| lumps, % | 100 | 0 | 0 |
| hardness, kg. | 9 | 0 | 0 |
| TVA Bottle Test | | | |
| with SSP 50/50 | after 3 days deliquesced | more than 60 days usable | more than 60 days usable |
| with TSP 50/50 | after 3 days deliquesced | more than 60 days usable | more than 60 days usable |

EXAMPLE IV

A urea melt to which magnesium oxide had been added was granulated in a rotary horizontal granulation drum having a diameter of 90 cm and a width of 60 cm. The drum was provided on its inner wall with eight longitudinal strips of 3.5 × 60 cm spaced equal distances from each other. The speed was 15 rpm. The drum was filled with 60 kg urea granules having an average diameter of 1.8 mm and a temperature of 80° C. Using two hydraulic sprayers, 60 kg anhydrous urea melt (99.8% by weight of urea), to which 0.6% by weight of MgO had been added, having a temperature of 140°–145° C. was sprayed into the rotary drum at a rate of approximately 100 kg/h over the granules showered from the longitudinal strips. The granulation was effected at 110° C.

At the end of the test, the granules were cooled to approximately 30° C. and sieved. The product granules had a good roundness and a smooth surface. Their apparent density was 1.288 g/cm³ and the crushing strength dia. 2.5 mm was 3.5 kg. Flydust formation was 3.9 g/kg. The granules had virtually no caking tendency. 50/50 blends with SSP and with TSP were usable for more than 60 days. The sieve analysis of the product was as follows:

>4.00 mm: 17%
4.00–2.5 mm: 46%
2.5–2.0 mm: 29%
<2.0 mm: 8%
average diameter: 3.0 mm.

What we claim is:

1. In a process for the production of urea granules, wherein an aqueous urea solution having a urea concentration of at least 70% by weight and containing a crystallization retarder for the urea is sprayed in the form of very fine droplets into a fluidized bed of urea particles at a temperature at which the water evaporates from the solution sprayed onto the particles and urea solidifies on the particles to form granules having a desired size, the improvement which comprises employing as the crystallization retarder for the urea in the aqueous urea solution MgO as such or in the form of selectively or completely calcined dolomite in an amount of 0.1 to 2.0% by weight of MgO, calculated on the urea in the solution, said crystallization retarder imparting improved mechanical strength to said urea granules, reducing caking and dust formation during the granulation process and rendering said urea granules compatible with single and triple superphosphate to form bulk blends of fertilizer.

2. A process as claimed in claim 1 wherein the aqueous urea solution has a urea concentration of 85 to 96% by weight.

3. Compatible heterogeneous fertilizer blends of urea granules produced by application of the process as claimed in claim 1 with single or triple superphosphate granules.

4. Blends of urea granules as described in claim 3 which further comprises KCl granules.

* * * * *